(12) United States Patent
Gregory et al.

(10) Patent No.: US 10,164,774 B2
(45) Date of Patent: Dec. 25, 2018

(54) SECURING A DIRECTED ACYCLIC GRAPH

(71) Applicant: BITCASA, INC., San Mateo, CA (US)

(72) Inventors: Jeff Gregory, Mountain View, CA (US); Tom Hill, Los Altos, CA (US); Marcos Klein, Mountain View, CA (US); David C. Lawrence, Hayward, CA (US); Joel Ward, San Francisco, CA (US)

(73) Assignee: PUCCINI WORLD LIMITED, Wanchai (HK)

( * ) Notice: Subject to any disclaimer, the term of this patent is extended or adjusted under 35 U.S.C. 154(b) by 375 days.

(21) Appl. No.: 14/719,287

(22) Filed: May 21, 2015

(65) Prior Publication Data

US 2015/0341167 A1 Nov. 26, 2015

Related U.S. Application Data

(60) Provisional application No. 62/002,127, filed on May 22, 2014.

(51) Int. Cl.
*H04L 9/08* (2006.01)
*G06F 13/36* (2006.01)
(Continued)

(52) U.S. Cl.
CPC ............ *H04L 9/0822* (2013.01); *G06F 13/36* (2013.01); *G06F 13/37* (2013.01); *G06F 15/173* (2013.01);
(Continued)

(58) Field of Classification Search
CPC ..... H04L 9/0822; H04L 9/0866; H04L 12/40; H04L 63/00; H04L 63/06; H04L 2209/24;
(Continued)

(56) References Cited

U.S. PATENT DOCUMENTS 6,633,886 B1 10/2003 Chong
7,853,018 B2 12/2010 Atallah et al.
(Continued)

FOREIGN PATENT DOCUMENTS

GB 2486462 A 6/2012

OTHER PUBLICATIONS

Dongsu Han; XIA: Efficient Support for Evolvable Internetworking; NSDI: 2012; p. 1-14.*
(Continued)

*Primary Examiner* — Monjur Rahim
(74) *Attorney, Agent, or Firm* — Nicholson De Vos Webster & Elliott LLP

(57) ABSTRACT

A method and apparatus for securing a directed acyclic graph (DAG) is described. In one embodiment, an algorithm enables encryption of a DAG given a start node (an entry-point), the node key for that node, and a path to traverse in the graph. A unique and cryptographically random key is generated for each node (sometimes referred herein as a unique node key). The node key encrypts the node it is generated for and also any edges exiting the node. The node key is stored on the incoming edge to the node (the edge from its parent node) encrypted with the node key of the parent node. Storing the keys on the edges of the DAG instead of on nodes of the DAG enables efficient querying of the DAG and the ability for a node to have multiple parents that may change without affecting the node's relationship with the non-changing parents.

18 Claims, 13 Drawing Sheets

(51) Int. Cl.
- *G06F 13/37* (2006.01)
- *G06F 15/173* (2006.01)
- *H04L 12/40* (2006.01)
- *H04L 29/06* (2006.01)
- *G06F 17/30* (2006.01)

(52) U.S. Cl.
CPC ...... *G06F 17/30958* (2013.01); *H04L 9/0866* (2013.01); *H04L 12/40* (2013.01); *H04L 63/00* (2013.01); *H04L 63/06* (2013.01); *H04L 2209/24* (2013.01); *H04L 2463/062* (2013.01)

(58) Field of Classification Search
CPC ... H04L 2463/062; G06F 13/36; G06F 13/37; G06F 15/173
USPC ........................................................ 380/281
See application file for complete search history.

(56) References Cited

U.S. PATENT DOCUMENTS

| | | | |
|---|---|---|---|
| 7,895,666 B1 | 2/2011 | Eshghi et al. | |
| 8,363,662 B2 | 1/2013 | Thubert et al. | |
| 8,451,744 B2 | 5/2013 | Vasseur | |
| 2004/0015496 A1* | 1/2004 | Anonsen | G06F 17/30607 |
| 2004/0153642 A1 | 8/2004 | Plotkin et al. | |
| 2005/0002532 A1* | 1/2005 | Zhou | H04L 9/302 380/277 |
| 2005/0238175 A1 | 10/2005 | Plotkin et al. | |
| 2007/0127721 A1* | 6/2007 | Atallah | H04L 9/088 380/277 |
| 2012/0243683 A1 | 9/2012 | Oba et al. | |

OTHER PUBLICATIONS

PCT International Search Report for PCT/US2015/032288, dated Aug. 28, 2015, 3 pages.

Written Opinion for PCT/US2015/032288, dated Aug. 28, 2015, 5 pages.

Ning Cao, et al., Privacy-Preserving Query over Encrypted Graph-Structured Data in Cloud Computing, 2011 31st International Conference on Distributed Computing Systems, IEEE Computer Society, pp. 393-402.

Extended European Search Report for Application No. 15795620.2, dated Nov. 17, 2017, 8 pages.

Qiu S., et al., "Versioned File Backup and Synchronization for Stroage Clouds," 2013 13th IEEE/ACM International Symposium on Cluster, Cloud and Grid Computing (CCGRID), IEEE, May 13, 2013, pp. 302-310.

\* cited by examiner

NODES TABLE 310

| NODE ID | DATA |
|---|---|
| 110 | UK1(DATA) |
| 115 | K1(DATA) |
| 120 | K2(DATA) |
| 125 | K3(DATA) |
| 130 | K4(DATA) |

EDGES TABLE 320

| FROM-ID | TO-ID | DATA |
|---|---|---|
| IMPLICIT | 110 | Cred(UK1) |
| 110 | 115 | UK1(K1) |
| 110 | 120 | UK1(K2) |
| 120 | 125 | K2(K3) |
| 120 | 130 | K2(K4) |

FIG. 3

NODES TABLE 1010

| NODE ID | DATA |
|---|---|
| 710 | UK2(DATA) |
| 715 | K5(DATA) |

EDGES TABLE 1020

| FROM-ID | TO-ID | DATA |
|---|---|---|
| IMPLICIT | 710 | Cred(UK2) |
| 710 | 715 | UK2(K5) |
| 710 | 120 | UK2(K2) |

FIG. 10

NODES TABLE 1210

| NODE ID | DATA |
|---|---|
| 110 | UK1(DATA) |
| 115 | K1(DATA) |
| 120 | K2(DATA) |
| 125 | K3(DATA) |
| 130 | K4(DATA) |

EDGES TABLE 1220

| FROM-ID | TO-ID | DATA |
|---|---|---|
| IMPLICIT | 110 | Cred(UK1) |
| 110 | 115 | UK1(K1) |
| 115 | 120 | K1(K2) |
| 120 | 125 | K2(K3) |
| 120 | 130 | K2(K4) |

FIG. 12

SECURING A DIRECTED ACYCLIC GRAPH

CROSS-REFERENCE TO RELATED APPLICATIONS

This application claims the benefit of U.S. Provisional Application No. 62/002,127, filed May 22, 2014, which is hereby incorporated by reference.

FIELD

Embodiments of the invention relate to the field of directed graphs; and more specifically, to securing a directed acyclic graph.

BACKGROUND

Graphs in computer science are a well-defined and understood concept. A directed acyclic graph (DAG) is a directed graph with no directed cycles and is formed by a collection of nodes and directed edges where each edge connects one node to another. In a DAG, there is a root node that is a node that has no incoming edges and from which all other nodes in the graph may be reached. The identifier (ID) of this root node is stored somewhere outside the graph itself to be used as an entrypoint to the graph when querying.

There are some variations of graph encryption that attempt to maintain a high level of flexibility for the general purpose graph but most are not efficient in the case of a directed acyclic graph (DAG). For example, there is a system of pre-computing indices based on common queries such that a query can generate a superset of the desired result with further filtering of the result set pruning false positives.

BRIEF DESCRIPTION OF THE DRAWINGS

The invention may best be understood by referring to the following description and accompanying drawings that are used to illustrate embodiments of the invention. In the drawings:

FIG. 3 illustrates an exemplary data structure representation of the DAG of FIG. 1 according to one embodiment;

FIG. 10 illustrates an exemplary data structure representation of the DAG illustrated in FIG. 7 after a node has been shared according to one embodiment;

FIG. 12 illustrates an exemplary data structure representation of the DAG illustrated in FIG. 1 after a node has been moved in accordance with FIG. 11 according to one embodiment;

DESCRIPTION OF EMBODIMENTS

Figure 1:
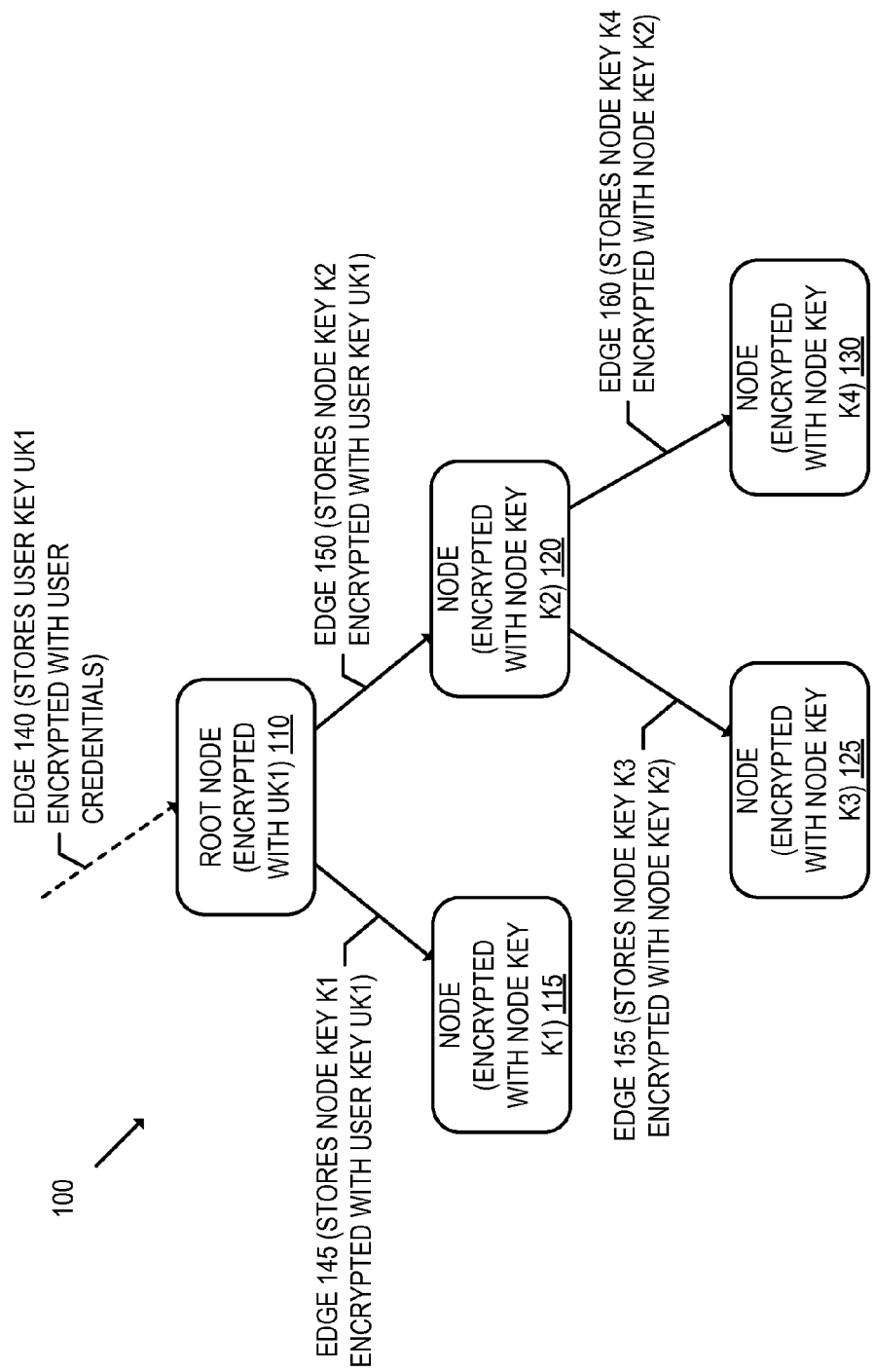
FIG. 1 illustrates an exemplary DAG secured according to embodiments of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for securing a directed acyclic graph (DAG) is described. In one embodiment, an algorithm for encrypting a DAG is described that enables encryption of a DAG given a start node (an entrypoint), the node key for that node, and a path to traverse in the graph, where keys are stored on the edges of the DAG instead of on nodes of the DAG. Storing the keys on the edges of the DAG instead of on nodes of the DAG enables efficient querying of the DAG and the ability for a node to have multiple parents that may change without affecting the node's relationship with the non-changing parents. A unique and cryptographically random key is generated for each node created within the DAG (sometimes referred herein as a unique node key). The node key encrypts the node it is generated for and also any edges exiting the node. The node key is not stored with the node. Instead, the node key is stored on the incoming edge to the node (the edge from its parent node) encrypted with the node key of the parent node. In the case of the root node, there is an implicit edge from outside the DAG where the node key of the root node is stored.

In one embodiment, the DAG described herein represents a file system where each node represents metadata (e.g., name, size, creation timestamp, modification timestamp, access control listings/permissions, read-only marker, hidden file marker, other application specific data, etc.) regarding a folder or file. The file system may be a cloud based file system. The secure DAG described herein allows a cloud based file system storage solution to be implemented with efficient management of metadata and while not being able to access any file data or sensitive information related to the files and folders stored. Queries on the DAG are made using a path already traversed, which in the case of a file system, is the ordered list of folders the user has navigated into.

Using embodiments of the invention, efficiencies are discovered in common operation such as connecting a node to a new parent node while possibly removing its connection to an existing parent (e.g., in a move operation in the case the DAG represents a file system). In such a case, only a single new edge is needed to be created (not a new node) and only the encryption of the existing node key for the node being moved, with the node key of the new parent node, needs to be performed.

FIG. 1 illustrates an exemplary DAG 100 secured according to embodiments of the invention. The DAG 100 includes several nodes and edges starting at a root node 110 which has an implicit incoming edge 140. The DAG 100 is generated for or belongs to a user. The implicit edge 140 stores a unique encryption key that is generated for the user, referred to in the figure as user key UK1. This user key UK1 is also the node key for the root node 110. In one embodiment, the user key is encrypted with credentials of the user (e.g., encrypted with the password of the user) and is stored persistently outside of the DAG in association with the ID of the root node 110. The user key UK1 is also used to encrypt the contents of the root node 110.

The root node 110 is the parent node for the nodes 115 and 120. A unique cryptographically secure random key is generated for the node 115 (referred to as node key K1 in the figure) and a unique cryptographically secure random key is generated for the node 120 (referred to as node key K2 in the figure). The node key K1 is used to encrypt the contents of the node 115 and the node key K2 is used to encrypt the contents of the node 120. The node key K1 is encrypted with the node key for the root node 110 (the user key UK1) and the result is stored on the edge 145 from the root node 110 to the node 115. The node key K1 is not persistently stored other than an encrypted version of the node key K1 (encrypted with the user key UK1) on the edge from its parent node (the root node 110) to the node it was created for (the node 115). The node key K2 is encrypted with the node key for the root node 110 (the user key UK1) and the result is stored on the edge 150 from the root node 110 to the node 120. The node key K2 is not persistently stored other than an encrypted version of the node key K2 (encrypted with the user key UK1) on the edge from its parent node (the root node 110) to the node it was created for (the node 120).

The node 120 is the parent node for the nodes 125 and 130. A unique cryptographically secure random key is generated for the node 125 (referred to as node key K3 in the figure) and a unique cryptographically secure random key is generated for the node 130 (referred to as node key K4 in the figure). The node key K3 is used to encrypt the contents of the node 125 and the node key K4 is used to encrypt the contents of the node 130. The node key K3 is encrypted with the node key for its parent node (the node key K2 for the node 120) and the result is stored on the edge 155 from the node 120 to the node 125. The node key K3 is not persistently stored other than an encrypted version of the node key K3 (encrypted with the node key K2) on the edge from its parent node (the node 120) to the node it was created for (the node 125). The node key K4 is encrypted with the node key for its parent node (the node key K2 for the node 120) and the result is stored on the edge 160 from the node 120 to the node 130. The node key K4 is not persistently stored other than an encrypted version of the node key K4 (encrypted with the node key K2) on the edge from its parent node (the node 120) to the node it was created for (the node 130).

Figure 2:
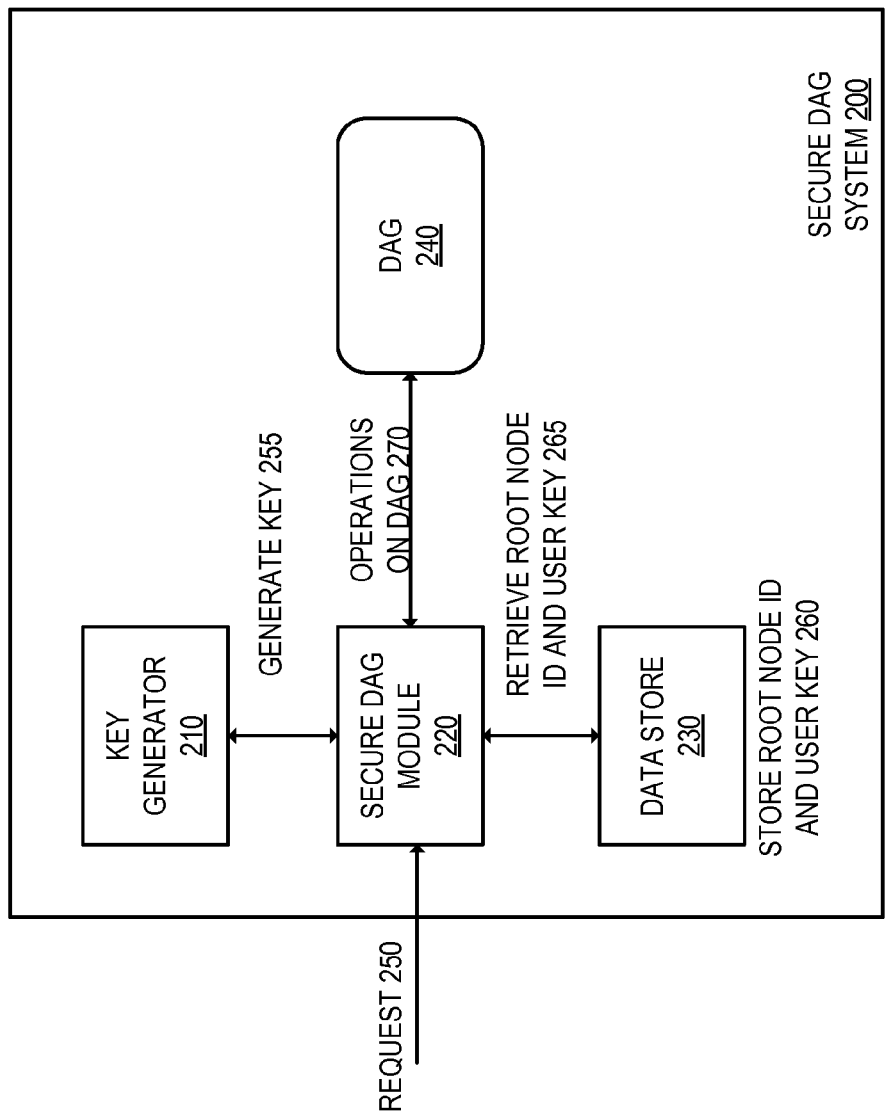
FIG. 2 is a block diagram that illustrates an exemplary secure DAG system according to one embodiment.

FIG. 2 is a block diagram that illustrates an exemplary secure DAG system 200 according to one embodiment. The secure DAG system 200 includes the key generator 210, the secure DAG module 220, the data store 230, and the DAG 240. The secure DAG module 220 performs many of the operations for securing a DAG as will be described in greater detail later herein. The secure DAG module 220 receives requests 250 to perform different types of operations which will be described in greater detail later herein (e.g., add a new user to the system, add a node to a DAG, remove a node from a DAG, move a node within the DAG, share a node of the DAG with another user). As part of some of these operations, the secure DAG module 220 may request the key generator 210 to generate 255 a unique, cryptographically secure key. For example and as will be described in greater detail later herein, the secure DAG module 220 may request the key generator 210 to generate a unique, cryptographically secure key for a node that is being created in the DAG 240. The data store 230 stores 260 the root node ID of the DAG 240 and the user key for the user belonging to the DAG 240. The root node ID acts as an entrypoint into the DAG 240. The secure DAG module 220 retrieves 265 the root node ID and user key from the data store 230 when traversing the DAG 240. The secure DAG module 220 performs operations 270 on the DAG 240 as will be described in greater detail later herein (e.g., adding nodes to the DAG 240, removing nodes from the DAG 240, moving a node in the DAG 240, traversing the DAG 240, and sharing a node in the DAG 240). Although FIG. 2 illustrates a single DAG 240, it should be understood that there may be many different DAGs belonging to several different users being managed by the secure DAG module 220.

The secure DAG system 200 may be part of a local client computing device in some embodiments (e.g., desktop computer, laptop computer, tablet computer, smart phone, set top box, gaming console, wearable computer, etc.). In other embodiments the secure DAG system 200 may be part of a server computing device that operates in a cloud based file system where client computing devices transmit requests for operations to be performed on their DAG and are returned data from the cloud based file system.

FIG. 3 illustrates an exemplary data structure representation of the DAG 100 according to one embodiment. It should be understood that the data structure representation illustrated in FIG. 3 is exemplary and the invention is not limited to any particular data structure for representing the DAG. As illustrated in FIG. 3, the nodes table 310 includes a column for a node identifier and a column for data. Each row in the nodes table 310 identifies a node in the DAG 100 and the data stored in the node. For example, the node 110 stores data encrypted with the user key UK1 (represented as UK1(Data)), the node 115 stores data encrypted with the node key K1 (represented as K1(Data)), the node 120 stores data encrypted with the node key K2 (represented as K2(Data)), the node 125 stores data encrypted with the node key K3 (represented as K3(Data)), and the node 130 stores data encrypted with the node key K4 (represented as K4(Data)). The edges table 320 includes a "From-ID" column that identifies the origin of an edge, a "To-ID" column that identifies the destination of the edge, and a data column that identifies the data stored on that edge. For example, the implicit edge 140 starts from an implicit node and goes to the node 110 and stores the user key UK1 encrypted with credentials for the user, the edge 145 starts from the node 110 and goes to the node 115 and stores the node key K1 encrypted with the user key UK1 (represented as UK1(K1)), the edge 150 starts from the node 110 and goes to the node 115 and stores the node key K2 encrypted with the user key UK1 (represented as UK1(K2)), the edge 155 starts from the node 120 and goes to the node 125 and stores the node key K3 encrypted with the node key K2 (represented as K2(K3)), and the edge 160 starts from the node 120 and goes to the node 130 and stores the node key K4 encrypted with the node key K2 (represented as K2(K4)).

Figure 4:
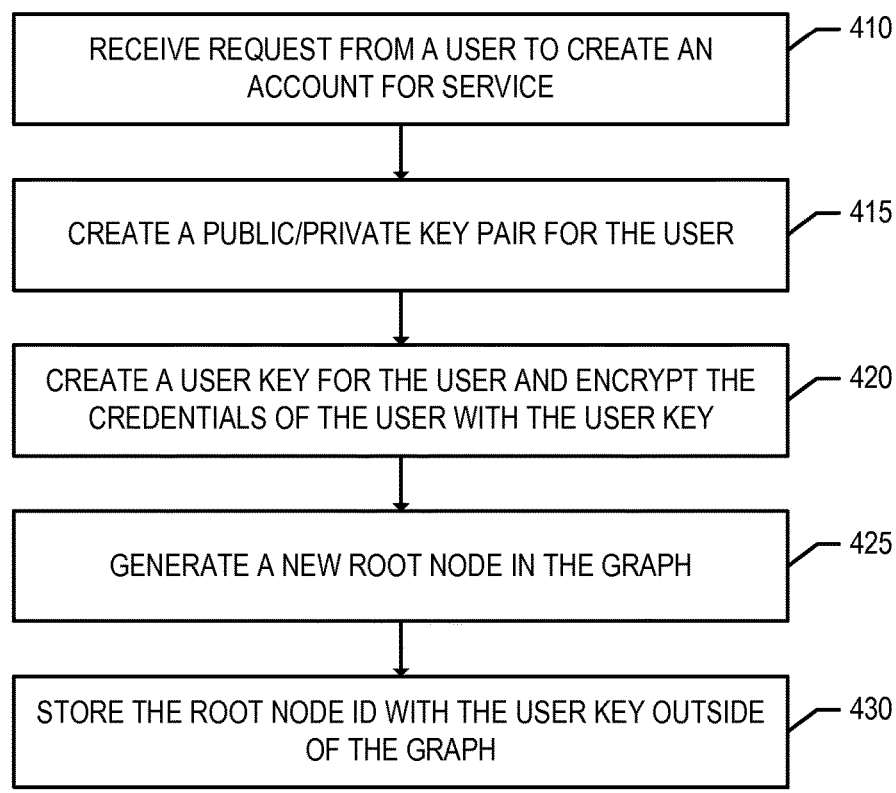
FIG. 4 is a flow diagram that illustrates exemplary operations performed when a user registers for a service or account that utilizes a secure directed acyclic graph according to one embodiment.

FIG. 4 is a flow diagram that illustrates exemplary operations performed when a user registers for a service or account that utilizes a secure directed acyclic graph according to one embodiment. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

At operation 410, a request is received from a user to create an account for a service which may include establishing credentials for the user such as a username and password for the service. For example, the secure DAG module 220 may receive a request to create a user. Flow then moves to operation 415 where a public/private key pair is generated for the user that is appropriate to the type of public key cryptography desired. Flow then moves to operation 420 where a unique cryptographically secure random key is generated for the user, referred to as the user key, and the credentials of the user is encrypted with the user key. For example the secure DAG module 220 requests the key generator 210 to generate the user key for the user. Flow then moves to operation 425 where the secure DAG module 220 creates a new root node in the DAG 240 for the user and encrypts the content of the root node with the generated user key. Flow then moves to operation 430 where the root node identifier is stored with the user key outside of the DAG. For example, the secure DAG module 220 causes the root node ID and the user key to be stored in the data store 230.

Adding a Node to the DAG

Figure 5:
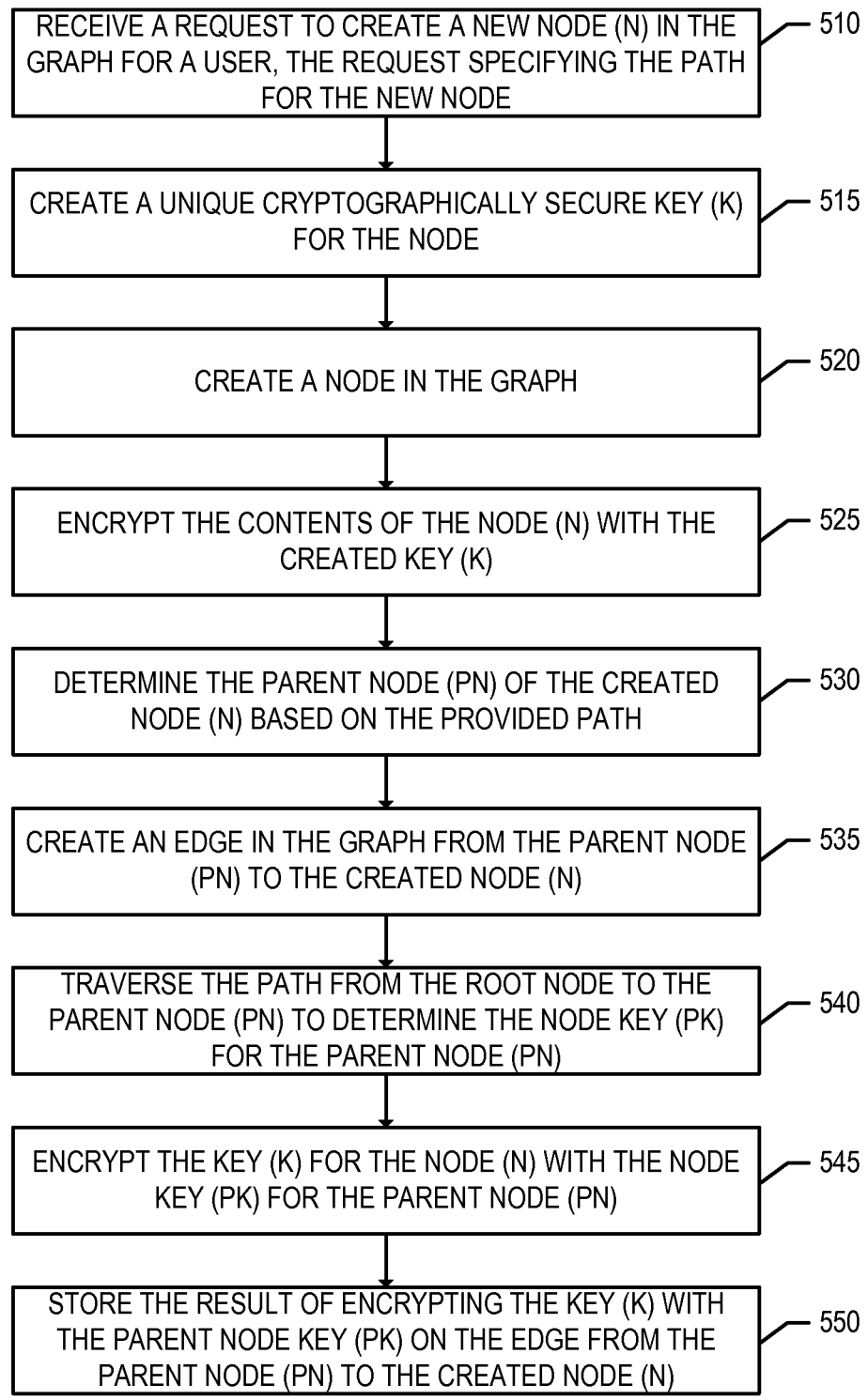
FIG. 5 is a flow diagram illustrating exemplary operations performed when adding a node to a secured DAG according to an embodiment of the invention.

FIG. 5 is a flow diagram illustrating exemplary operations performed when adding a node to a secured DAG according to an embodiment of the invention. At operation 510, the secure DAG module 220 receives a request to create a new node (N) in the DAG 240 for a user. The request specifies the path for the new node. By way of example with reference to FIG. 1, the node 120 is being created. The request may be received from a user in conjunction with the user wanting to create or store information. For example, in the embodiment where the DAG represents a file system, the request may be received from a user that is creating a folder (a directory) or a file in the file system. Flow then moves to operation 515.

At operation 515, the secure DAG module 220 causes a unique cryptographically secure key (K) for the new node (N) to be created through use of the key generator 210. The key generator 210 may be a cryptographically secure pseudo-random number generator. Flow then moves to operation 520 where the secure DAG module 220 creates a node in the DAG 240 for the new node (N). For example with respect to FIG. 1, the node 120 is created including adding an entry in the nodes table 310 of FIG. 3.

Flow then moves to operation 525 where the secure DAG module 220 encrypts the contents of the node (N) being added with the key (K) created for the node (N). For example with respect to FIG. 1, the contents of the node 120 is encrypted with the node key K2 generated for the node 120. It should be understood that the encrypted node content is stored on the node, the key to encrypt and decrypt the node is not stored on the node.

Flow then moves to operation 530 where the secure DAG module 220 determines the parent node (PN) of the newly added node (N) based on the path provided in the request. For example with respect to FIG. 1, the parent node of the node 120 is the root node 110. Flow then moves to operation 535.

At operation 535, the secure DAG module 220 creates an edge in the DAG 240 from the parent node (PN) of the newly created node (N) to the newly created node (N). For example with respect to FIG. 1, the edge 150 is created from the root node 110 to the node 120 and an entry is added in the edges table 320 for the created edge.

Flow then moves to operation 540 where the secure DAG module 220 traverses the path from the root node to the parent node (PN) of the newly created node (N) to determine the node key (PK) of the parent node (PN). The node key of the parent node (PN) is stored on the edge from its parent node to itself in an encrypted form (encrypted with the node key of its parent node or with the user key in case the parent node is the root node). For example, with reference to FIG. 1, the node key of the parent node of 120 (which is the root node 110) is stored on the edge 140 in an encrypted form (encrypted by the user key UK1). The operations performed when traversing the path will be described in greater detail with respect to FIG. 9. Flow moves from operation 540 to operation 545.

At operation 545, the secure DAG module 220 encrypts the node key (K) for the newly created node (N) with the node key (PK) of the parent node (PN). For example with respect to FIG. 1, the node key K2 of the node 120 is encrypted with the node key of its parent node (the user key UK1).

Flow then moves to operation 550 where the secure DAG module 220 stores the result of encrypting the node key (K) for the newly created node (N) with the node key (PK) of the parent node (PN) on the edge from the parent node (PN) to the newly created node (N). For example with respect to FIG. 1, the edge 150 stores the result of encrypting the node key K2 of node 120 with the user key UK1.

Removing a Node from the DAG

Figure 6:
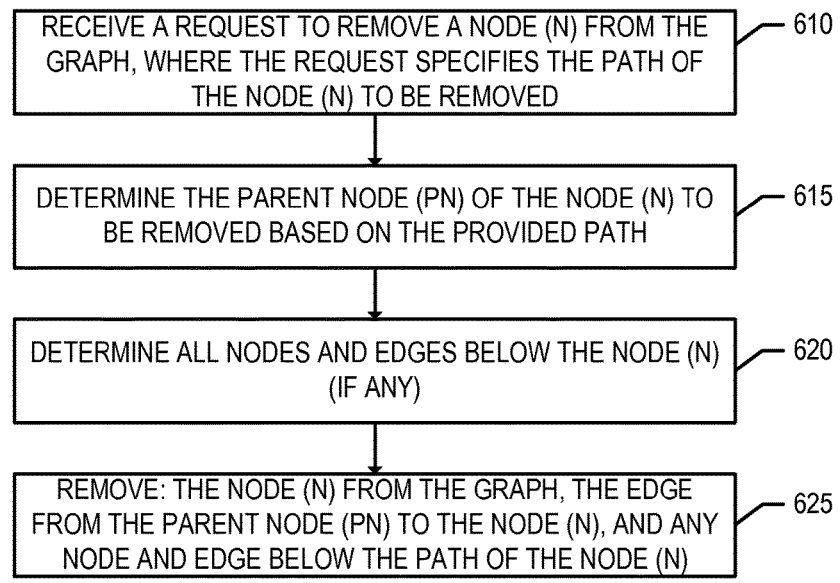
FIG. 6 is a flow diagram illustrating exemplary operations performed when removing a node from a secured DAG according to an embodiment of the invention.

FIG. 6 is a flow diagram illustrating exemplary operations performed when removing a node from a secured DAG according to an embodiment of the invention. At operation 610, the secure DAG module 220 receives a request to remove a node (N) from the DAG 240. The request specifies the path of the node (N) to be removed. The request may be received as a user wanting to delete information from the graph. For example, in the embodiment where the DAG 240 represents a file system, the request may be received from a user that wants to delete a folder or file in the file system. Flow then moves to operation 615.

At operation 615, the secure DAG module 220 determines the parent node (PN) of the node (N) to be removed based on the provided path. If there is no parent node (i.e., the node to be removed is the root node), then all of the nodes and edges are removed from the DAG. However in the case that there is a parent node, only certain nodes and edges are removed from the DAG. Flow moves to operation 620 where the secure DAG module 220 determines all nodes and edges below the node (N) (the children of the node being removed), if any. For example, if the node 120 of FIG. 1 is being removed, the secure DAG module 220 determines that the nodes 125 and 130 and the edges 155 and 160 are below the node 120. Flow then moves to operation 625 where the secure DAG module 220 removes the following from the DAG 240: the node (N) from the DAG 240, the edge from the parent node (PN) to the node (N), and any node and edge below the path of the node (N).

Sharing a Node with Another User

In some embodiments a user is able to share a node of theirs with another user. For example in the embodiment where the secure DAG represents a cloud based file system, a first user can choose any point in their file system (e.g., directory or file) to share with one or more other users. In some embodiments a user receiving a shared file or folder may choose to mount the shared file or folder on their own client device and access the shared file or folder through the normal way of accessing files and folders within their operating system. In some embodiments the user making the share may set access restrictions on the share and may be different for different users (e.g., read-only, modify, full control, etc.).

Figure 7:
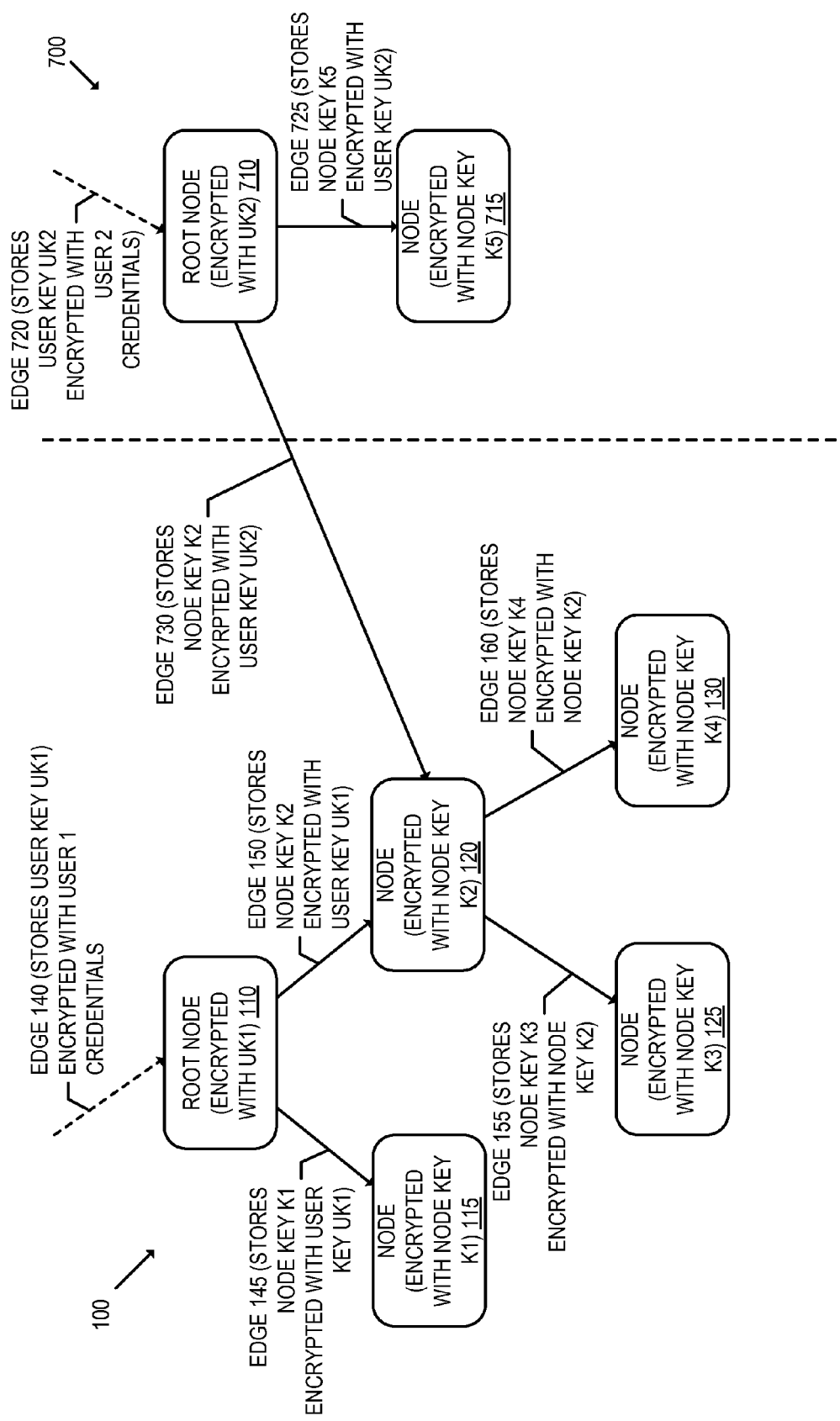
FIG. 7 illustrates multiple secured DAGs for multiple users where a first user shares a node with a second user according to embodiments of the invention.

FIG. 7 illustrates multiple secured DAGs for multiple users where a first user shares a node with a second user according to embodiments of the invention. FIG. 7 illustrates the secure DAG 100 illustrated and described with respect to FIG. 1 and the secure DAG 700 that belongs to a second user. The secure DAG 700 includes the root node 710 that has an implicit incoming edge 720 that stores a unique encryption key that is generated for the user belonging to the secure DAG 700, referred to in FIG. 7 as user key UK2, that is encrypted with the credentials for the user belonging to the secure DAG 700. This user key UK2 is also the node key for the root node 710. In one embodiment, the user key UK2 is encrypted with credentials of the second user (e.g., encrypted with the password of the user) and is stored persistently outside of the DAG 700 in association with the ID of the root node 710. The user key UK2 is also used to encrypt the contents of the root node 710. The root node 110 is the parent node for the node 715. A unique cryptographically secure random key is generated for the node 715 (referred to as node key K5 in the figure). The node key K5 is used to encrypt the contents of the node 715. The node key K5 is encrypted with the node key for the root node 710 (the user key UK2) and the result is stored on the edge 725 from the root node 710 to the node 715. The node key K5 is not persistently stored other than an encrypted version of the node key K5 (encrypted with the user key UK2) on the edge from its parent node (the root node 710) to the node it was created for (the node 715).

Figure 8:
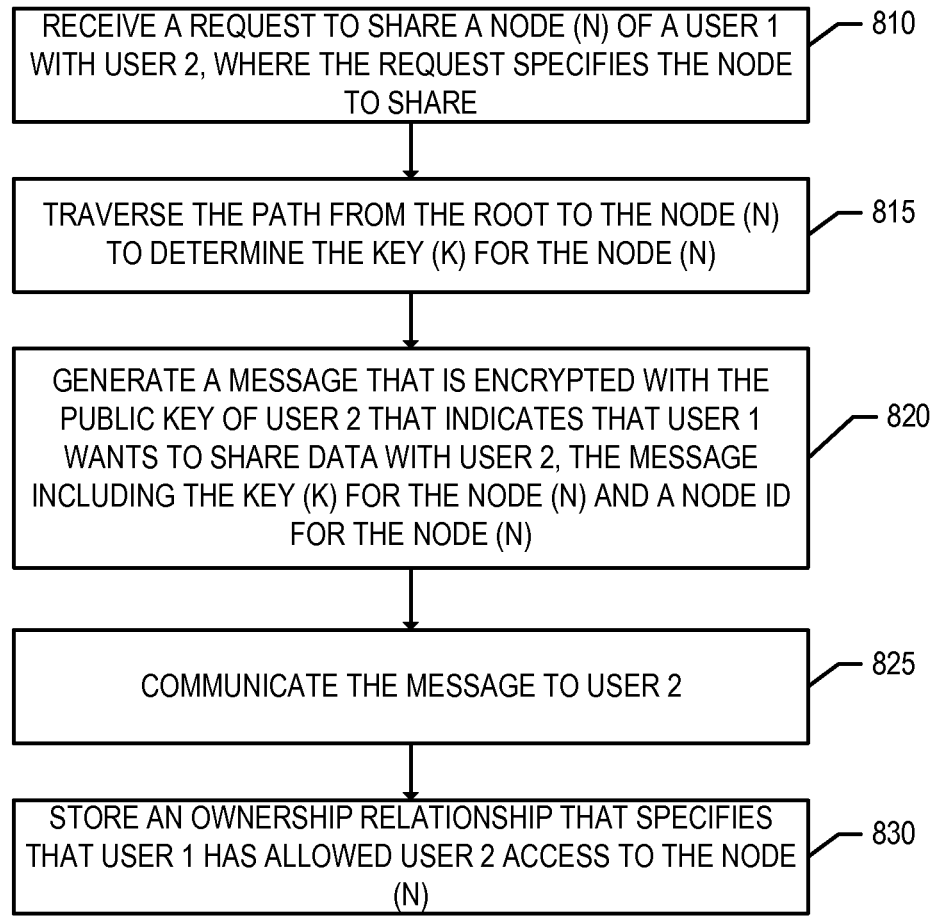
FIG. 8 is a flow diagram that illustrates exemplary operations performed when a first user has elected to share data with a second user in a system with a secure DAG according to one embodiment.

At some point the user belonging to the secure DAG 100 has selected to share data associated with the node 120 (and inherently any data of children nodes of the node 120) with the user that belongs to the secure DAG 700. FIG. 8 is a flow diagram that illustrates exemplary operations performed when a first user has elected to share data with a second user in a system with a secure DAG according to one embodiment. At operation 810, the secure DAG module 220 receives a request to share a node (N) of a first user (user 1) with a second user (user 2). The request specifies the node to share. With reference to FIG. 7, the user belonging to the secure DAG 100 has requested that data of the node 120 be shared with the user belonging to the secure DAG 700. Flow then moves to operation 815.

At operation 815, the secure DAG module 220 traverses the path in the DAG from the root node to the node (N) that is being shared to determine the node key (K) for the node (N). The node key (K) for the node (N) being shared is stored on its incoming edge from its parent node in an encrypted state (encrypted with the node key of the parent node or with the user key in case the parent node is the root node). For example with reference to FIG. 1, the node key for the node 120 is stored on the edge 150 in an encrypted form (encrypted with the node key of the root node 110). Flow then moves to operation 820.

At operation 820, the secure DAG module 220 generates a message for the second user (the user intended to receive the shared data) that indicates that the first user wants to share data with the second user. The message includes the node key (K) for the node (N) being shared and a node ID of the node (N) being shared encrypted with the public key of the second user (e.g., the message includes the result of encrypt([K,NodeID_N],Public_Key_User2). Operation then flows to operation 825 where the secure DAG module 220 causes the message to be communicated to the second user. For example, an email or other communication may be transmitted to the second user which then may select whether to accept the share.

Flow then moves to operation 830, which is optional in some embodiments, where the secure DAG module 220 causes an ownership relationship that specifies that the first user has allowed the second user access to the node (N) to be stored. In some embodiments the first user may revoke the access to node (N) given to the second user.

Figure 9:
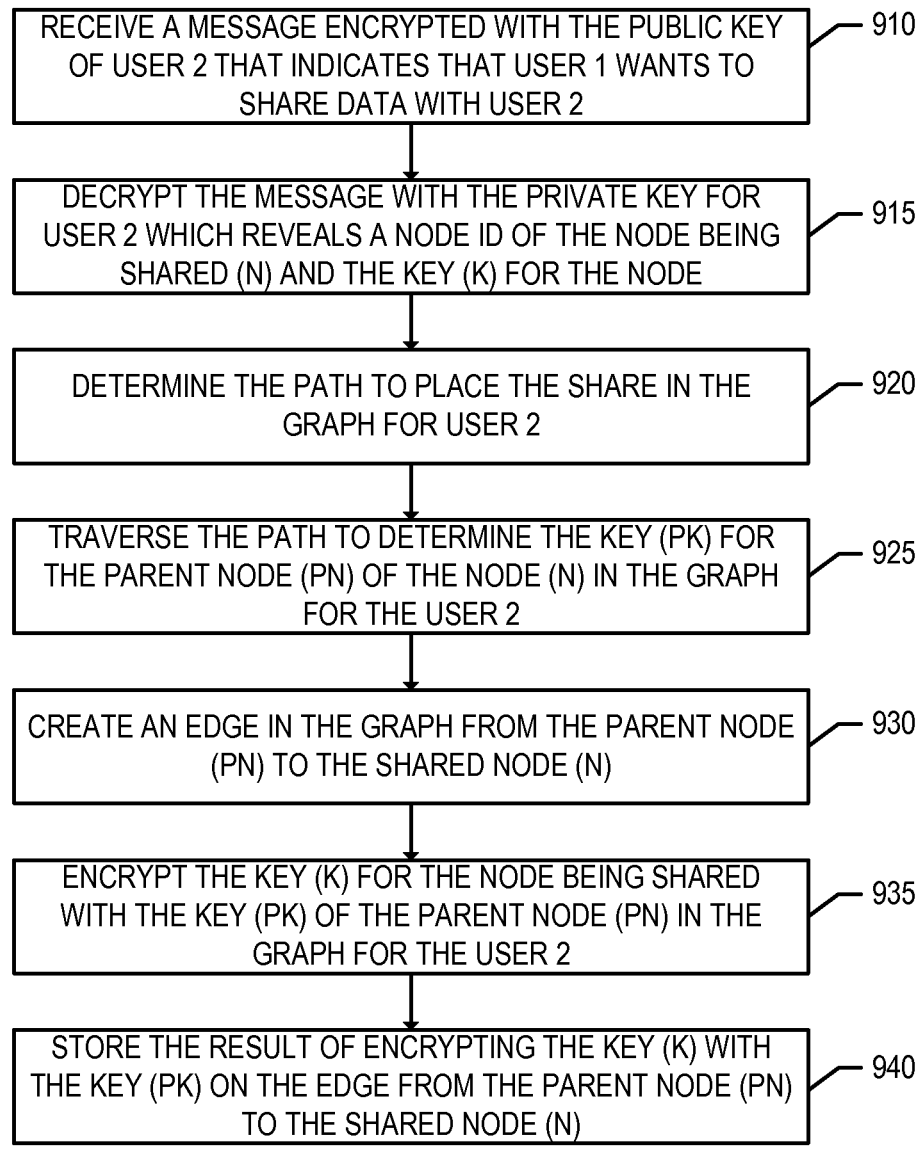
FIG. 9 is a flow diagram that illustrates exemplary operations performed in response to first user electing to share data with a second user in a system with a secure DAG according to one embodiment.

FIG. 9 is a flow diagram that illustrates exemplary operations performed in response to first user electing to share data with a second user in a system with a secure DAG according to one embodiment. At operation 910, the secure DAG module 220 receives a message encrypted with the public key of the second user that indicates that the first user wants to share data with a second user. Although not described as part of the flow, the second user may have elected to accept the share. Flow then moves from operation 910 to operation 915 where the secure DAG module 220 decrypts the message with the private key for the second user which reveals a node ID of the node being shared and a key node for the node being shared. For example with respect to FIG. 7, decrypting the message with the private key for the second user reveals a node ID of the node 120 and the node key K2 of the node 120. Flow then moves to operation 920.

At operation 920, the secure DAG module 220 determines the path to place the share in the DAG 700 for the second user. In one embodiment, the path is automatically placed under the root node of the DAG 700. In another embodiment, the path is selected by the second user. In the example of FIG. 7, the share is placed under the root node 710. Thus in the example of FIG. 7, the root node 710 is a parent node of the node being shared (the node 120). Flow then moves to operation 925.

At operation 925, the secure DAG module 220 traverses the path to determine the node key for the parent node of the node being shared in the DAG 700 for the second user. For example with reference to FIG. 7, the secure DAG module 220 traverses the path and determines the node key for the root node 710 (which is the parent node of the node being shared). In the example of FIG. 7, the node key for the root node 710 is the user key UK2. Flow then moves to operation 930.

At operation 930, the secure DAG module 220 creates an edge in the DAG for the second user from the parent node (PN) to the shared node (N). For example with reference to FIG. 7, the edge 730 is created from the root node 710 to the node 120. Flow then moves to operation 935 where the secure DAG module 220 encrypts the node key (K) for the node being shared with the node key for the parent node of the node being shared in the DAG 700 for the second user. For example with reference to FIG. 7, the node key K2 is encrypted with the user key UK2. Flow then moves to operation 940 where the secure DAG module 220 stores the result of encrypting the node key (K) for the node being shared with the node key for the parent node of the node being shared on the edge from the parent node (PN) to the shared node (N). For example with reference to FIG. 7, edge 730 stores the node key K2 encrypted with the user key UK2.

It should be understood that when a node is shared with another user, any children nodes (if any) of the shared node are also shared. For example with reference to FIG. 7, since the node 120 is shared, the nodes 125 and 130 are also shared because they are children nodes of the node 120. Thus the second user will have access to the data of not only the node 120 but also the nodes 125 and 130. By way of example if the second user wants to access the node 130, a request will be received by the secure DAG module that identifies the path from the root node 710 of the DAG of the second user to the node 120 of the DAG of the first user and then to the node 130 of the second user. The secure DAG module will decrypt the incoming edge 720 using the user credentials of the second user to reveal the user key UK2, then decrypt the edge 730 using the user key UK2 to reveal the node key K2, then decrypt the edge 160 using the node key K2 to reveal the node key K4, and finally decrypt the contents of the node 130 using the node key K4.

Although FIG. 9 has been described as being performed by the same secure DAG module (e.g., on a server connected to multiple client devices), the operations could be performed locally on a client computing device that is different than the client computing device making the share. To say it another way, in some embodiments the operations described with respect to FIGS. 8 and 9 are performed in a central location such as in a cloud; in other embodiments the operations described with respect to FIG. 8 are performed in a first client computing device and the operations described with respect to FIG. 9 are performed in a second client computing device.

FIG. 10 illustrates an exemplary data structure representation of the DAG 700 after the node 120 has been shared according to one embodiment. It should be understood that the data structure representation illustrated in FIG. 10 is exemplary and the invention is not limited to any particular data structure for representing the DAG. As illustrated in FIG. 10, the nodes table 1010 shows that the node 710 stores data encrypted with the user key UK2 (represented as UK2(Data)) and the node 715 stores data encrypted with the node key K5 (represented as K5(Data)). The edges table 1020 shows that the implicit edge 720 starts from an implicit node and goes to the node 710 and stores the user key UK1 encrypted with credentials for the user, the edge 725 starts from the node 710 and goes to the node 715 and stores the node key K5 encrypted with the user key UK2 (represented as UK2(K5)), and the edge 730 starts from the node 710 and goes to the node 120 and stores the node key K2 encrypted with the user key UK2 (represented as UK2(K2)).

Moving a Node

In some embodiments a user is able to move a node to a different part of the secure DAG. For example in the embodiment where the secure DAG represents a cloud based file system, a user can choose to move a folder or file to another location in the file system. Moving a node will cause a connection to a new node to be created and only a single new edge is needed to be created (not a new node itself) and only the encryption of the existing node key for the node being moved, with the node key of the new parent node, needs to be performed.

Figure 11:
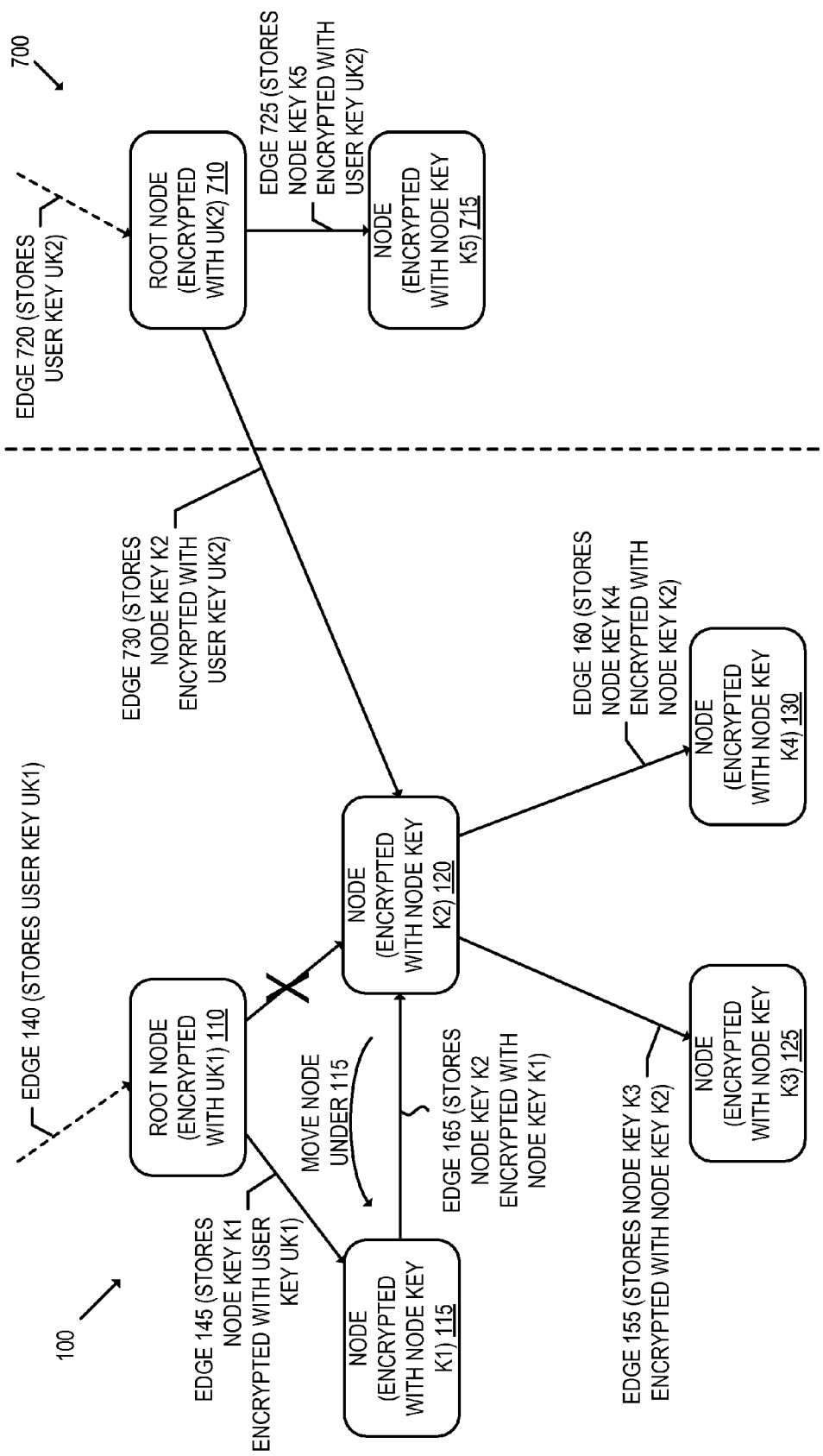
FIG. 11 illustrates the secured DAGs illustrated in FIG. 7 where a node has been moved according to embodiments of the invention.

FIG. 11 illustrates the secured DAGs illustrated in FIG. 7 where a node has been moved according to embodiments of the invention. As illustrated in FIG. 11, the node 120 is being moved from being a child node directly below the root node 110 to being a child node under the node 115. A new edge 165 is created from the new parent node 115 to the node being moved (120). The new edge 165 stores the node key K2 of the node 120 encrypted by the node key K1 of the new parent node 115. The edge 150 is removed from the DAG 100. The move operation does not affect the share of the node 120 from the user belonging to the DAG 100 to the user belonging to the DAG 700.

FIG. 12 illustrates an exemplary data structure representation of the DAG 100 after the node 120 has been moved in accordance with FIG. 11 according to one embodiment. It should be understood that the data structure representation illustrated in FIG. 12 is exemplary and the invention is not limited to any particular data structure for representing the DAG. As illustrated in FIG. 12, the nodes table 1210 is the same as the nodes table 310 and only the edge in the edges table 1220 to the node 120 has been changed.

Figure 13:
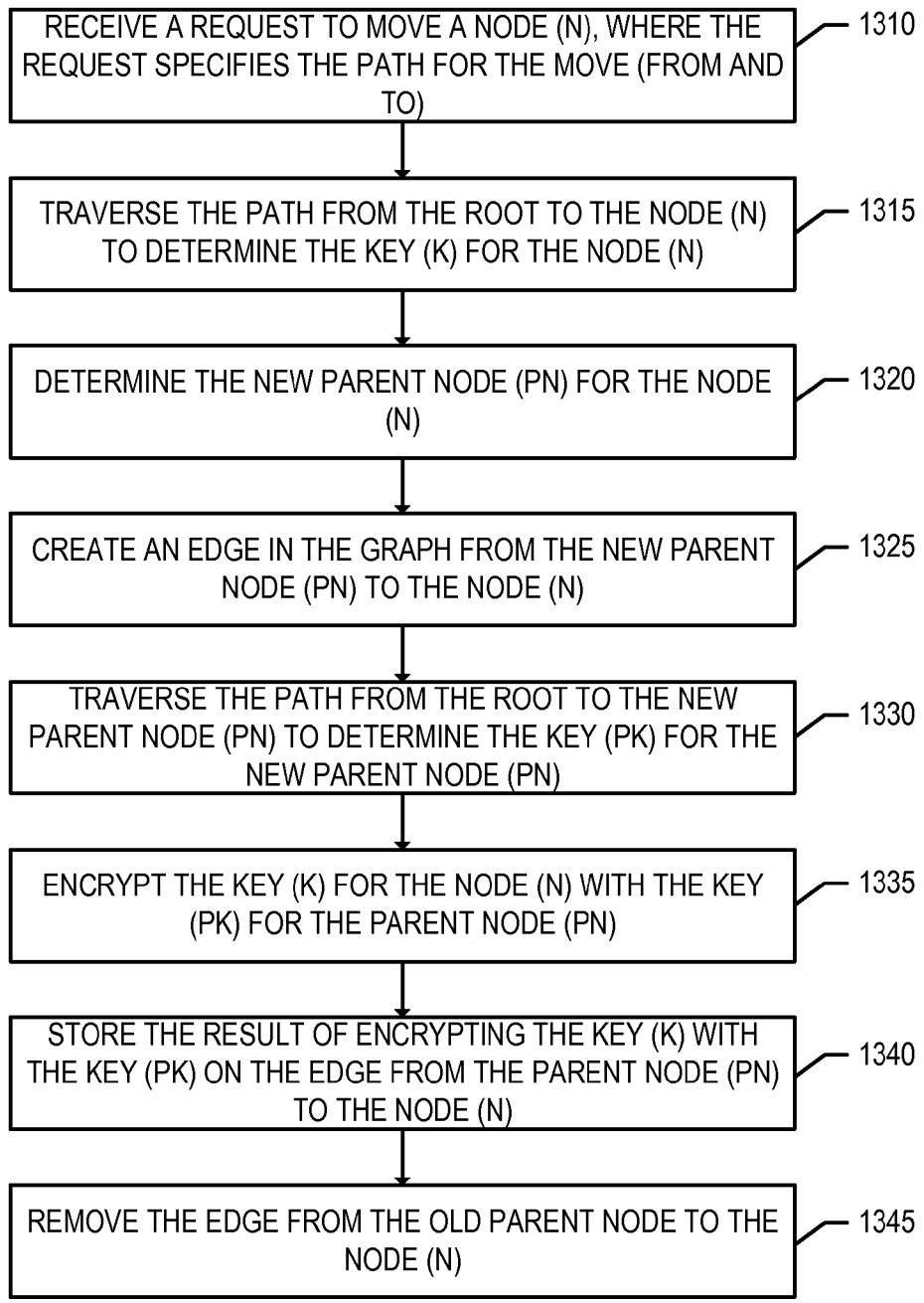
FIG. 13 is a flow diagram that illustrates exemplary operations performed to move a node in a secured DAG according to one embodiment.

FIG. 13 is a flow diagram that illustrates exemplary operations performed to move a node in a secured DAG according to one embodiment. At operation 1310, the secure DAG module 220 receives a request to move a node (N). The request may be received from a user. For example, in an embodiment where the DAG represents a file system, the request may be received as a result of a user moving a folder or file to another place in the file structure. For example with reference to FIG. 11, the node 120 is being moved from being directly under the root node 110 to being directly under the node 115. The request specifies the path for the move (from and to). Flow then moves to operation 1315 where the secure DAG module 220 traverses the path from the root node to the node (N) being moved to determine the node key (K) for that node. For example with reference to FIG. 11, the path from the root node 110 to the node 120 is traversed to determine the node key (K) for the node 120, which is the node key 120. The node key 120 is stored in an encrypted form (encrypted with the user key UK1) on the edge 150. Flow then moves to operation 1320.

At operation 1320, the secure DAG module 220 determines the new parent node (PN) for the node (N) being moved based on the provided path. For example with respect to FIG. 11, the new parent node (PN) is the node 115. Flow then moves to operation 1325 where the secure DAG module 220 creates an edge in the DAG from the new parent node (PN) to the node (N) being moved. For example with reference to FIG. 11, a new edge 165 is created from the node 115 to the node 120. Flow then moves to operation 1330.

At operation 1330, the secure DAG module 220 traverses the path from the root node to the new parent node (PN) to determine the node key (PK) for the new parent node. The node key (PK) for the new parent node is stored on its incoming edge (encrypted with the node key of its parent node, or in the case that the new parent node is the root node, encrypted with the user key). For example with respect to FIG. 11, the node key for the new parent node 115 is stored on its incoming edge 145 encrypted with the user key UK1. Flow then moves to operation 1335.

At operation 1335, the secure DAG module 220 encrypts the node key (K) for the node (N) being moved with the node key (PK) for the new parent node (PN). Flow then moves to operation 1340, where the secure DAG module 220 stores the result of encrypting the node key (K) for the node (N) being moved with the node key (PK) for the new parent node (PN) on the edge from the new parent node (PN) to the node (N) being moved. For example with reference to FIG. 11, the secure DAG module 220 encrypts the node key K2 with the node key K1 and stores the result on the edge 165 from the node 115 to the node 120. Flow then moves to operation 1345 where the secure DAG module 220 removes the edge from the old parent node to the node that is being moved.

Traversing the Graph

Figure 14:
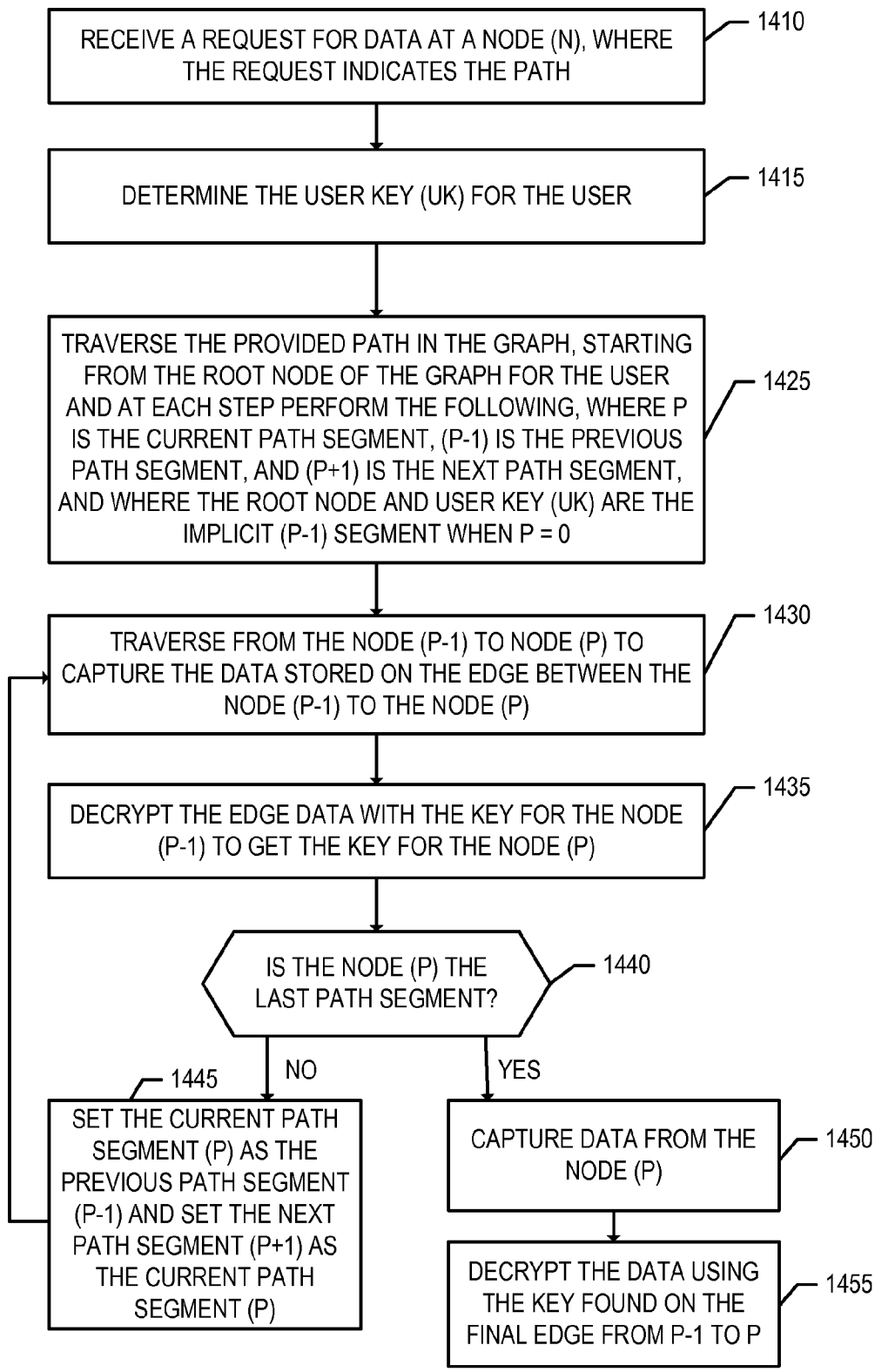
FIG. 14 is a flow diagram that illustrates exemplary operations for traversing a secured DAG according to some embodiments.

FIG. 14 is a flow diagram that illustrates exemplary operations for traversing a secured DAG according to some embodiments. At operation 1410, the secure DAG module 220 receives a request for data at a node (N), where the request indicates the path. In the case where the secure DAG represents a file system, the request may be received as a result of a user navigating to a folder or file within their file system. The request indicates the path. As an example throughout this flow diagram, the request indicates a request for data at the node 125 of FIG. 1. Flow then moves to operation 1415.

At operation 1415, the secure DAG module 220 determines the user key for the user making the request. By way of example, the secure DAG module 220 decrypts the data stored on the implicit incoming edge of the root node for the user with the provided credentials of the user, which may have been provided in conjunction with the request for data or have been provided earlier in time. For example with respect to FIG. 1, the secure DAG module 220 decrypts the data stored on the implicit edge 140 using the user credentials to reveal the user key UK1.

Assuming that the user key (UK) for the user is determined, flow then moves to operation 1425 where the secure DAG module 220 traverses the provided path in the secure DAG starting from the root node of the graph for the user and at each step performs the operations of 1430-1440, where (P) is the current path segment, (P−1) is the previous path segment, and (P+1) is the next path segment, and where the root node and the user key (UK) are the implicit (P−1) segment when P equals zero. At operation 1430, the secure DAG module 220 traverses from the node (P−1) to the node (P) to capture the data stored on the edge between the node (P−1) to the node (P). For example with respect to FIG. 1, the secure DAG module 220 traverses from the root node 110 to the node 120 to capture the data stored on the edge 150. As previously described, the data stored on the edge 150 is the node key K2 that has been encrypted with the user key UK1. Flow then moves to operation 1435 where the secure DAG module 220 decrypts the captured edge data with the node key for the node (P−1) to get the node key for the node (P). For example with reference to FIG. 1, the secure DAG module 220 uses the user key UK1 to decrypt the data stored on the edge 150 to reveal the node key K2.

Flow then moves to operation 1440 where the secure DAG module 220 determines whether the node (P) is the last path segment. If it is the last path segment, then flow moves to operation 1450. If it is not the last path segment, then flow moves to operation 1445. In the example of accessing data corresponding to the node 125, the node 120 is not the last path segment.

At operation 1445, the secure DAG module 220 sets the current path segment (P) as the previous path segment (P−1) and set the next path segment (P+1) as the current path segment (P). Flow then moves back to operation 1430. For example, with respect to FIG. 1, the secure DAG module 220 then traverses from the node 120 to the node 125 to capture the data stored on the edge 155. The data stored on the edge 155 includes the node key K3 that is encrypted by the node key K2. After capturing the data stored on the edge 155, the secure DAG module 220 decrypts the data using the node key K2 to reveal the node key K3. Since the node 125 is the node on the last path segment, then flow would move to operation 1450.

At operation 1450, the secure DAG module 220 captures data stored on the node (P). For example with respect to FIG. 1, the secure DAG module 220 captures the data stored on the node 125, which is encrypted data that is encrypted with the node key K3. Flow then moves to operation 1455 where the secure DAG module 220 decrypts the captured data using the key found on the final edge from node (P−1) to node (P). For example with reference to FIG. 1, the secure DAG module 220 decrypts the captured data of the node 125 using the node key K2 to reveal the contents of the node 125.

It should be understood that the all the nodes along a path need not accessed, only the edges and the final node in the case where the requested data is stored at the node.

Although FIG. 14 illustrates exemplary operations for traversing the DAG when the requested data is at a node, similar operations of traversing the path and decrypting are performed when the data requested is a node key that is stored in an encrypted form on an edge. For example, when adding a node to the graph, the path is traversed from the root node to the parent node of the node being added in an iterative fashion to reveal the node key of that parent node.

Figure 15:
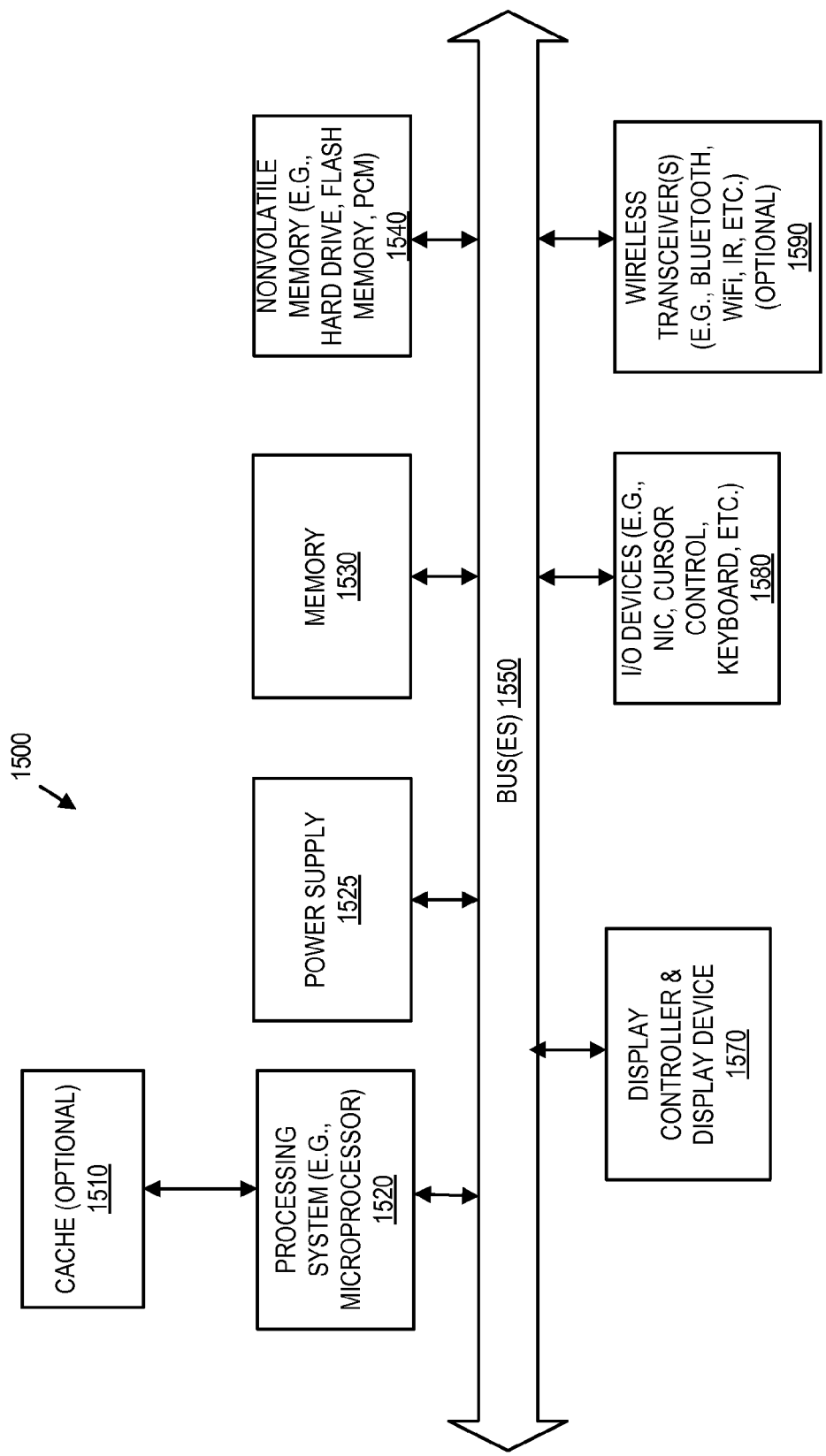
FIG. 15 illustrates an exemplary computer system that may be used in some embodiments.

As illustrated in FIG. 15, the computer system 1500, which is a form of a data processing system, includes the bus(es) 1550 which is coupled with the processing system 1520, power supply 1525, memory 1530, and the nonvolatile memory 1540 (e.g., a hard drive, flash memory, Phase-Change Memory (PCM), etc.). The bus(es) 1550 may be connected to each other through various bridges, controllers, and/or adapters as is well known in the art. The processing system 1520 may retrieve instruction(s) from the memory 1530 and/or the nonvolatile memory 1540, and execute the instructions to perform operations described herein. The bus 1550 interconnects the above components together and also interconnects those components to the display controller & display device 1570, Input/Output devices 1580 (e.g., NIC (Network Interface Card), a cursor control (e.g., mouse, touchscreen, touchpad, etc.), a keyboard, etc.), and the optional wireless transceiver(s) 1590 (e.g., Bluetooth, WiFi, Infrared, etc.). In one embodiment, the secure DAG system 200 is implemented on a computer system 1500.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a client computing device, a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for securing a first directed acyclic graph (DAG), comprising:
    receiving a request to create a first node in the first DAG, wherein the request specifies the path for the first node;
    creating a first unique cryptographically secure key for the first node;
    creating the first node in the first DAG;
    encrypting the contents of the first node in the first DAG with the created first unique cryptographically secure key for the first node;
    determining a parent node of the created first node in the first DAG based on the specified path;
    creating an edge in the first DAG from the parent node to the created first node;
    traversing a path from a root node of the first DAG to the parent node to determine a second unique cryptographically secure key that has been created for the parent node;
    encrypting the first unique cryptographically secure key with the second unique cryptographically secure key; and
    storing a result of the encrypting the first unique cryptographically secure key with the second unique cryptographically secure key on the created edge from the parent node to the created first node, wherein the first unique cryptographically secure key for the created first node is not stored on the created first node itself.

2. The method of claim 1, further comprising:
    receiving a request for data at the first node, wherein the request indicates a path that traverses from a root node of the first DAG to an intermediary node of the first DAG to the first node of the first DAG;
    determining a user key of a user making the request for data at the first node;
    capturing data stored on an edge from the root node to the intermediary node;
    decrypting the captured data using the user key of the user that reveals a unique cryptographically secure key for the intermediary node;
    capturing data stored on an edge from the intermediary node to the first node;
    decrypting the captured data using the unique cryptographically secure key for the intermediary node that reveals the first unique cryptographically secure key for the first node;
    capturing data stored on the first node; and
    decrypting the data stored on the first node using the first unique cryptographically secure key.

3. The method of claim 1, further comprising:
    receiving a request to remove a second node from the first DAG, wherein the request specifies the path for the second node;
    determining a parent node of the second node based on the specified path for the second node;
    determining all nodes and edges below the second node; and
    removing the second node from the first DAG, the edge in the first DAG from the parent node of the second node to the second node, and any node and edge below the path of the second node.

4. The method of claim 1, further comprising:
    receiving a request to move the first node, wherein the request specifies a path of where the first node is presently located and where the first node is to be moved;
    traversing the path from the root node of the first DAG to the first node to determine the first unique cryptographically secure key created for the first node;
    determining a new parent node for the first node based on the provided path;
    creating an edge in the first DAG from the new parent node to the first node in its moved location;
    traversing the path from the root node of the first DAG to the new parent node to determine a third unique cryptographically secure key of the new parent node;
    encrypting the first unique cryptographically secure key with the third unique cryptographically secure key;
    storing a result of the encrypting the first unique cryptographically secure key with the third unique cryptographically secure key on the created edge from the new parent node to the first node in its moved location; and
    removing an edge in the first DAG from the previous parent node of the first node to the first node.

5. The method of claim 1, further comprising:
    receiving a request to share a third node of a first user with a second user, wherein the request specifies the third node that is to be shared;
    traversing a path from the root node of the first DAG to determine a third unique cryptographically secure key that has been created for the third node;
    generating a message that is encrypted with a public key of the second user, wherein the message indicates that the first user wants to share data with the second user, and wherein the message includes the third unique cryptographically secure key for the third node and a node identifier for the third node; and
    communicating the generated message to the second user.

6. The method of claim 5, further comprising:
storing an ownership relationship that specifies that the first user has allowed the second user access to the third node.

7. The method of claim 5, further comprising:
receiving the message encrypted with the public key of the second user that indicates that the first user wants to share data with the second user;
decrypting the message with a private key of the second user, wherein the decrypted message reveals the node identifier for the third node and the third unique cryptographically secure key;
determining a path to place the third node in a second DAG for the second user;
determining a parent node of the third node in the second DAG;
traversing the path from a root node of the second DAG to the parent node of the third node in the second DAG to determine a fourth unique cryptographically secure key for the parent node of the third node in the second DAG;
creating an edge in the second DAG from the parent node of the third node in the second DAG to the third node in the first DAG;
encrypting the third unique cryptographically secure key with the fourth unique cryptographically secure key; and
storing a result of the encrypting the third unique cryptographically secure key with the fourth unique cryptographically secure key on the created edge in the second DAG from the parent node of the third node in the second DAG to the third node in the first DAG.

8. The method of claim 7, wherein the path is determined to be placed under a root node of the second DAG.

9. The method of claim 7, wherein the path is selected by the second user.

10. A non-transitory machine-readable storage medium that provides instructions that, when executed by a processor, will cause said processor to perform operations comprising:
receiving a request to create a first node in a first directed acyclic graph (DAG), wherein the request specifies the path for the first node;
creating a first unique cryptographically secure key for the first node;
creating the first node in the first DAG;
encrypting the contents of the first node in the first DAG with the created first unique cryptographically secure key for the first node;
determining a parent node of the created first node in the first DAG based on the specified path;
creating an edge in the first DAG from the parent node to the created first node;
traversing a path from a root node of the first DAG to the parent node to determine a second unique cryptographically secure key that has been created for the parent node;
encrypting the first unique cryptographically secure key with the second unique cryptographically secure key; and
storing a result of the encrypting the first unique cryptographically secure key with the second unique cryptographically secure key on the created edge from the parent node to the created first node, wherein the first unique cryptographically secure key for the created first node is not stored on the created first node itself.

11. The non-transitory machine-readable storage medium of claim 10, wherein the non-transitory machine-readable storage medium further provides instructions that, when executed by the processor, cause said processor to perform the following operations:
receiving a request for data at the first node, wherein the request indicates a path that traverses from a root node of the first DAG to an intermediary node of the first DAG to the first node of the first DAG;
determining a user key of a user making the request for data at the first node;
capturing data stored on an edge from the root node to the intermediary node;
decrypting the captured data using the user key of the user that reveals a unique cryptographically secure key for the intermediary node;
capturing data stored on an edge from the intermediary node to the first node;
decrypting the captured data using the unique cryptographically secure key for the intermediary node that reveals the first unique cryptographically secure key for the first node;
capturing data stored on the first node; and
decrypting the data stored on the first node using the first unique cryptographically secure key.

12. The non-transitory machine-readable storage medium of claim 11, wherein the non-transitory machine-readable storage medium further provides instructions that, when executed by the processor, cause said processor to perform the following operations:
receiving a request to remove a second node from the first DAG, wherein the request specifies the path for the second node;
determining a parent node of the second node based on the specified path for the second node;
determining all nodes and edges below the second node; and
removing the second node from the first DAG, the edge in the first DAG from the parent node of the second node to the second node, and any node and edge below the path of the second node.

13. The non-transitory machine-readable storage medium of claim 11, wherein the non-transitory machine-readable storage medium further provides instructions that, when executed by the processor, cause said processor to perform the following operations:
receiving a request to move the first node, wherein the request specifies a path of where the first node is presently located and where the first node is to be moved;
traversing the path from the root node of the first DAG to the first node to determine the first unique cryptographically secure key created for the first node;
determining a new parent node for the first node based on the provided path;
creating an edge in the first DAG from the new parent node to the first node in its moved location;
traversing the path from the root node of the first DAG to the new parent node to determine a third unique cryptographically secure key of the new parent node;
encrypting the first unique cryptographically secure key with the third unique cryptographically secure key;
storing a result of the encrypting the first unique cryptographically secure key with the third unique cryptographically secure key on the created edge from the new parent node to the first node in its moved location; and removing an edge in the first DAG from the previous parent node of the first node to the first node.

14. The non-transitory machine-readable storage medium of claim 11, wherein the non-transitory machine-readable storage medium further provides instructions that, when executed by the processor, cause said processor to perform the following operations:

receiving a request to share a third node of a first user with a second user, wherein the request specifies the third node that is to be shared;

traversing a path from the root node of the first DAG to determine a third unique cryptographically secure key that has been created for the third node;

generating a message that is encrypted with a public key of the second user, wherein the message indicates that the first user wants to share data with the second user, and wherein the message includes the third unique cryptographically secure key for the third node and a node identifier for the third node; and communicating the generated message to the second user.

15. The non-transitory machine-readable storage medium of claim 14, wherein the non-transitory machine-readable storage medium further provides instructions that, when executed by the processor, cause said processor to perform the following operations:

storing an ownership relationship that specifies that the first user has allowed the second user access to the third node.

16. The non-transitory machine-readable storage medium of claim 14, wherein the non-transitory machine-readable storage medium further provides instructions that, when executed by the processor, cause said processor to perform the following operations:

receiving the message encrypted with the public key of the second user that indicates that the first user wants to share data with the second user;

decrypting the message with a private key of the second user, wherein the decrypted message reveals the node identifier for the third node and the third unique cryptographically secure key;

determining a path to place the third node in a second DAG for the second user;

determining a parent node of the third node in the second DAG;

traversing the path from a root node of the second DAG to the parent node of the third node in the second DAG to determine a fourth unique cryptographically secure key for the parent node of the third node in the second DAG;

creating an edge in the second DAG from the parent node of the third node in the second DAG to the third node in the first DAG;

encrypting the third unique cryptographically secure key with the fourth unique cryptographically secure key; and storing a result of the encrypting the third unique cryptographically secure key with the fourth unique cryptographically secure key on the created edge in the second DAG from the parent node of the third node in the second DAG to the third node in the first DAG.

17. The non-transitory machine-readable storage medium of claim 16, wherein the path is determined to be placed under a root node of the second DAG.

18. The non-transitory machine-readable storage medium of claim 16, wherein the path is selected by the second user.

* * * * *